US007450537B1

(12) United States Patent
Peterson

(10) Patent No.: US 7,450,537 B1
(45) Date of Patent: Nov. 11, 2008

(54) INTERMIXING COMMUNICATION MODES ON A TIME DOMAIN MULTIPLE ACCESS NETWORK

(75) Inventor: Edward Douglas Peterson, El Cajon, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 616 days.

(21) Appl. No.: 11/108,142

(22) Filed: Apr. 12, 2005

Related U.S. Application Data

(63) Continuation-in-part of application No. 10/373,148, filed on Feb. 24, 2003, now Pat. No. 7,301,959.

(51) Int. Cl.
*H04B 7/212* (2006.01)
(52) U.S. Cl. .................. 370/321; 370/498; 370/337; 370/347
(58) Field of Classification Search .................. 370/442, 370/443, 437
See application file for complete search history.

(56) References Cited

U.S. PATENT DOCUMENTS 7,042,863 B1* 5/2006 Morris ........................ 370/338
2002/0080816 A1* 6/2002 Spinar et al. ................ 370/449

* cited by examiner

*Primary Examiner*—Ricky Ngo
*Assistant Examiner*—Ben H Liu
(74) *Attorney, Agent, or Firm*—Arthur K. Samora; Kyle Eppele

(57) ABSTRACT

An intermixing communication modes on a TDMA network system. The system includes a relay, at least one AC channel controller, at least one DC channel controller, at least two AC users and at least one DC user. The at least one AC channel controller is capable of transmitting a master channel frame and receiving data on a master channel. The at least one DC channel controller is capable of transmitting data on a slave channel frame and receiving data on a slave channel associated with the master channel. The at least two AC users are capable of transmitting and receiving signals via the relay. The at least one DC user is capable of receiving information regarding reserved DC time slots in the slave channel frame from a CCOW of the master channel frame. A method for an intermixing communication modes on a TDMA network is also described.

9 Claims, 4 Drawing Sheets

INTERMIXING COMMUNICATION MODES ON A TIME DOMAIN MULTIPLE ACCESS NETWORK

CROSS-REFERENCE TO RELATED APPLICATION

This application is a continuation-in-part of U.S. application Ser. No.: 10/373,148, filed 24 FEB. 2003 now U.S. Pat. No. 7,301,959, entitled, "System and Method For Multiplying Communications Capacity On A Time Domain Multiple Access Network Using Slave Channeling", hereby incorporated by reference herein in its entirety for its teachings on communications systems, and referred to hereafter as "the parent application." The invention is related to commonly assigned U.S. Pat. No.: 6,301,262, issued 9 OCT. 2001, entitled "System And Method For Determining Message Transmission Time For Establishing A Communications Link On A Time Domain Multiple Access Network", hereby incorporated by reference in its entirety herein for its teachings on communication systems, and referred to hereafter as "the '262 patent."

BACKGROUND

The patent application is generally in the field of communication systems.

Typical time domain multiple access (TDMA) communication systems cannot contemporaneously operate in both distributed control (DC) mode and automatic control (AC) mode.

A need exists for a TDMA communication system that is capable of contemporaneously operating in both DC mode and AC mode.

DETAILED DESCRIPTION

Described herein is Intermixing Communication Modes on a Time Domain Multiple Access Network.

Definitions

The following definitions and acronyms are used herein:

Acronym(s):
TDMA—Time Domain Multiple Access
DAMA—Demand Assigned Multiple Access
AC—Automatic Control
DC—Distributed Control
CS—Communication System(s)
CC—Channel Controller(s)
ACCC—Automatic Control Channel Controller(s)
DCCC—Distributed Control Channel Controller(s)
PCC—Primary Channel Controller(s)
ACC—Alternate Channel Controller(s)
ACU1—Automatic Control First User
ACU2—Automatic Control Second User
DCU3—Distributed Control Third User
CCOW—Channel Control Order Wire
RCCOW—Return Channel Control Order Wire Definition(s):

Earth coverage satellite—an object in temporary or permanent orbit around the Earth.

The method of intermixing communication modes on a time domain multiple access network includes operating in an AC mode and using a slave channel for DC mode users. In one embodiment, the method is implemented on a satellite communication system. In one embodiment, the method is implemented on a TDMA communication system and method. In one embodiment, the method is implemented on a TDMA demand assigned multiple access (DAMA) communication system and method. In one embodiment, the method is implemented on a TDMA DAMA communication system and method that is described in the '262 patent.

Figure 1A:
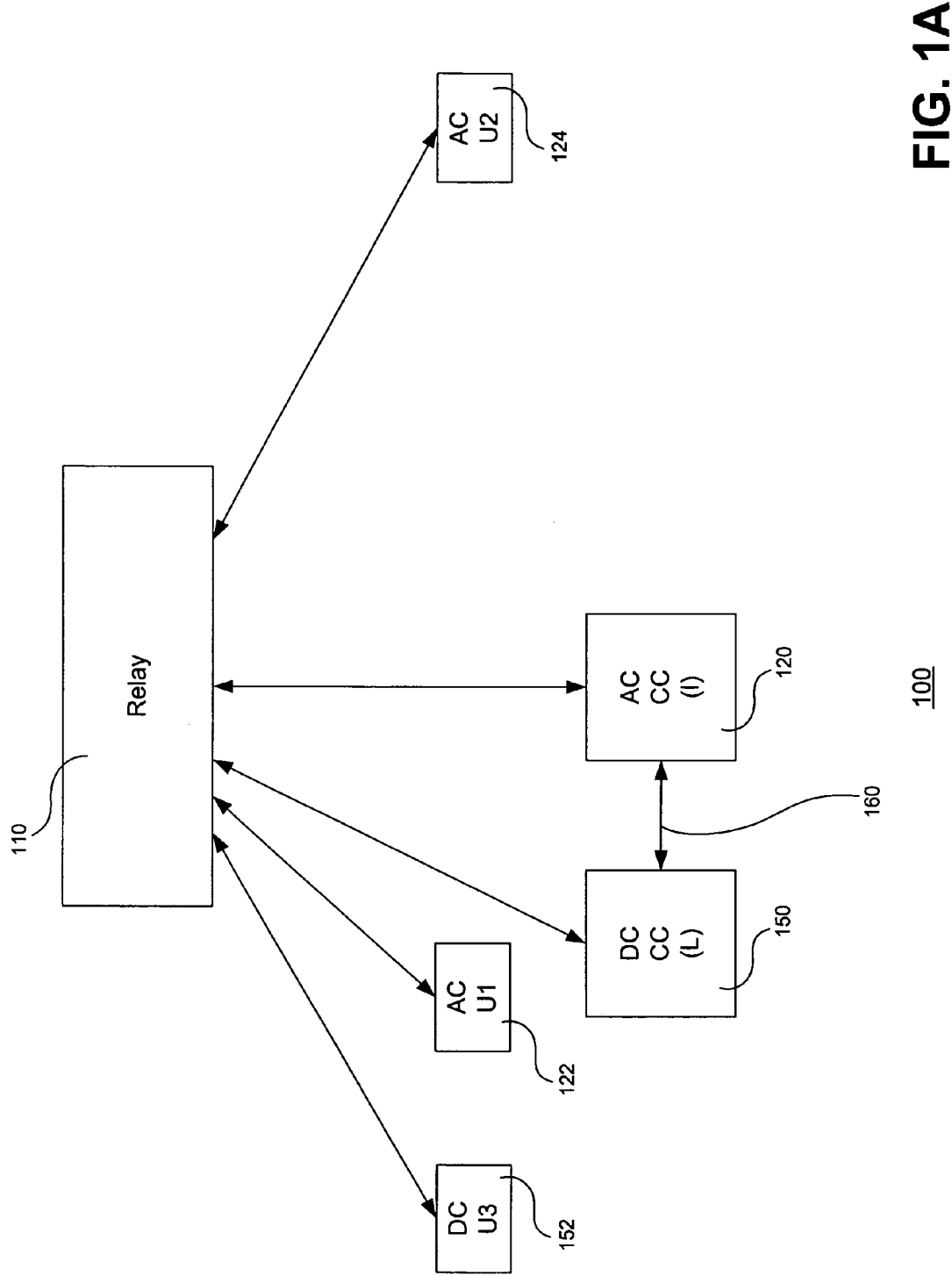
FIG. 1A is a block diagram of one embodiment of a communication system that can be used to implement a technique of Intermixing Communication Modes on a Time Domain Multiple Access Network.

FIG. 1A is a block diagram of one embodiment of an exemplary TDMA communication system (CS). In one embodiment, the exemplary TDMA CS is a TDMA satellite CS. As shown in FIG. 1, TDMA CS 100 includes relay 110, AC channel controller (CC) 120, DCCC 150, AC first user (ACU1) 122, AC second user (ACU2) 124 and DC third user (DCU3) 152. In one embodiment, relay 110 comprises an Earth coverage satellite. In one embodiment, relay 110 comprises a satellite capable of transmitting and receiving multiple frequency channels. ACCC 120 is capable of controlling channels in TDMA CS 100, which allow users to communicate. For example, ACCC 120 can select a master channel operating at frequency 1 for ACU1 122 and ACU2 124 to communicate. ACCC 120 is capable of controller master channels operating at frequencies 1 and slave channels operating at frequencies J, K and L of TDMA CS 100. In one embodiment, master channel 1 is hard linked to slave channel L (for communication with DC and AC users) and soft linked to slave channels J and K (for communication with AC users only). In one embodiment, ACCC 120 comprises multiplexers and radios. In one embodiment, ACCC 120 comprises PCC/ACC (primary channel controller/alternate channel controller) AC mode multiplexers and radios.

AC first user 122 and AC second user 124 are capable of transmitting and receiving signals. In one embodiment, AC first user 122 and AC second user 124 transmit and receive signals via relay 110. In one embodiment, AC first user 122 and AC second user 124 are capable of communicating via relay 110 and ACCC 120 and/or DCC 150. In an exemplary embodiment, ACU1 122 and ACU2 124 communicate on a master channel operating at frequency 1, which is controlled by ACCC 120 and relayed via relay 110.

DCCC 150 is capable of transmitting and receiving data on a channel of TDMA CS 100. DCCC 150 operates using DC mode control techniques such as providing a "plan of the day" for pre-assigning frequencies and time slots. In one embodiment, DCCC 150 transmits and receives data on a channel operating at frequency L. ACCC 120 is capable of time synchronizing with DCCC 150 using a system timing generator via communication link 160. In one embodiment, the system timing generator comprises a timing mark. In one embodiment, communication link 160 comprises a cable.

DC third user (DCU3) 152 is capable of transmitting and receiving signals. In one embodiment, DCU3 152 transmits and receives signals via relay 110. In one embodiment, DCU3 152 is capable of communicating via relay 110 and DCCC 150. In one embodiment, DCU3 152 comprises a multiplexer and a radio. In one embodiment, DCU3 152 comprises a PCC DC mode multiplexer and a radio.

Figure 1B:
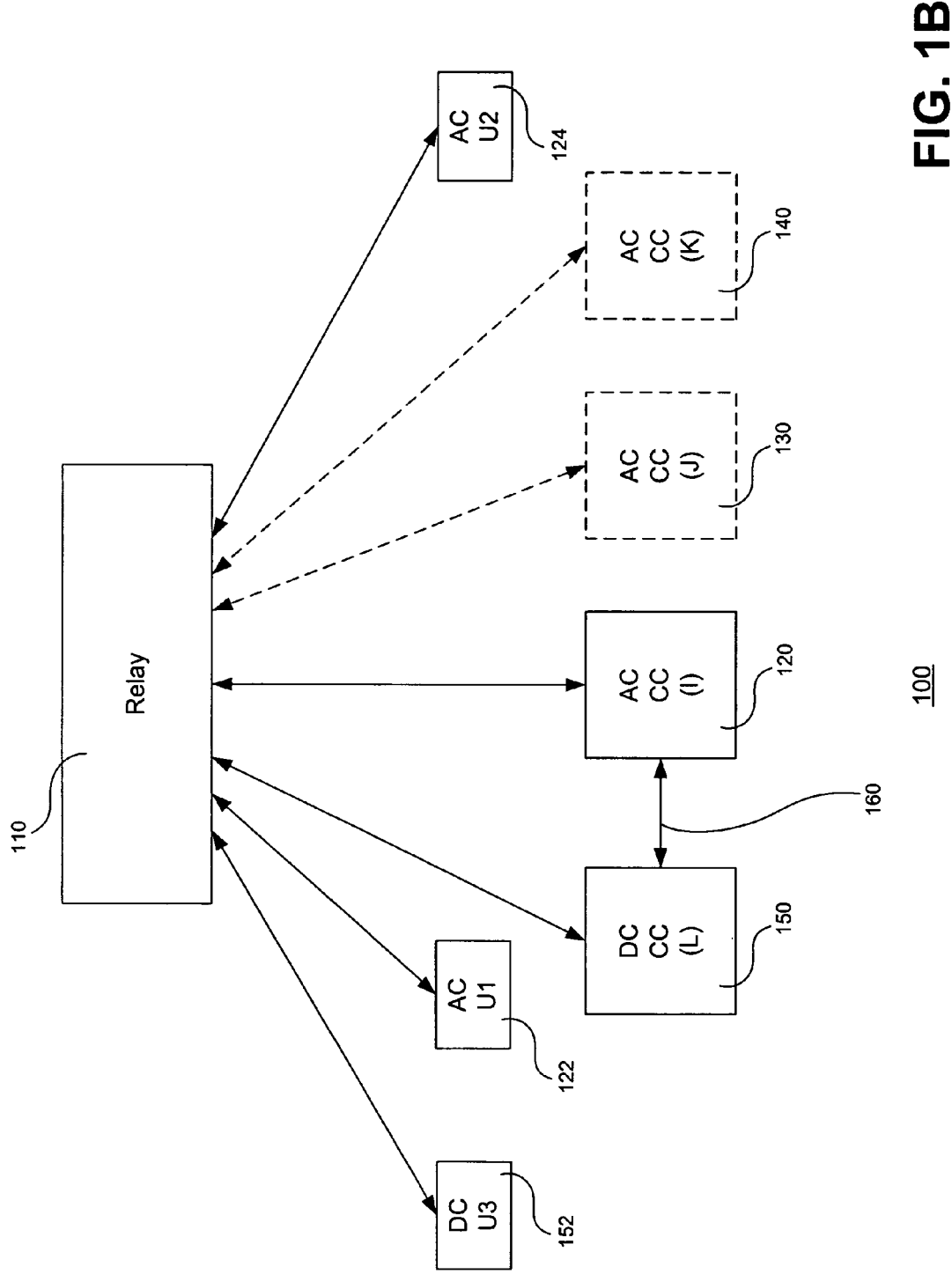
FIG. 1B is a block diagram of one embodiment of a communication system that can be used to implement a technique of Intermixing Communication Modes on a Time Domain Multiple Access Network.

FIG. 1B is a block diagram of one embodiment of an exemplary TDMA communication system. In one embodiment, the exemplary TDMA CS is a TDMA satellite CS. FIG. 1B is substantially similar to FIG. 1A, and thus, similar or identical components are not described in detail hereinagain. As shown in FIG. 1, TDMA CS 100 includes relay 110, ACCC 120, 130, 140, DCCC 150, ACU1 122, ACU2 124 and DCU3 152. ACCC 130, 140 are capable of controlling AC users using slave channels (e.g., frequencies J and K) soft linked to ACCC 120. Thus, ACCC 130, 140 control channels using the physical hardware of ACCC 120. In one embodiment, ACCC 130, 140 do not comprise physical hardware. In one embodiment, ACCC 120 uses time synchronization with AC users via receipt of CCOW from a master channel at frequency I, which directs AC users to communicate on a specified frequency (e.g., frequencies I, J, K and L).

Figure 2:
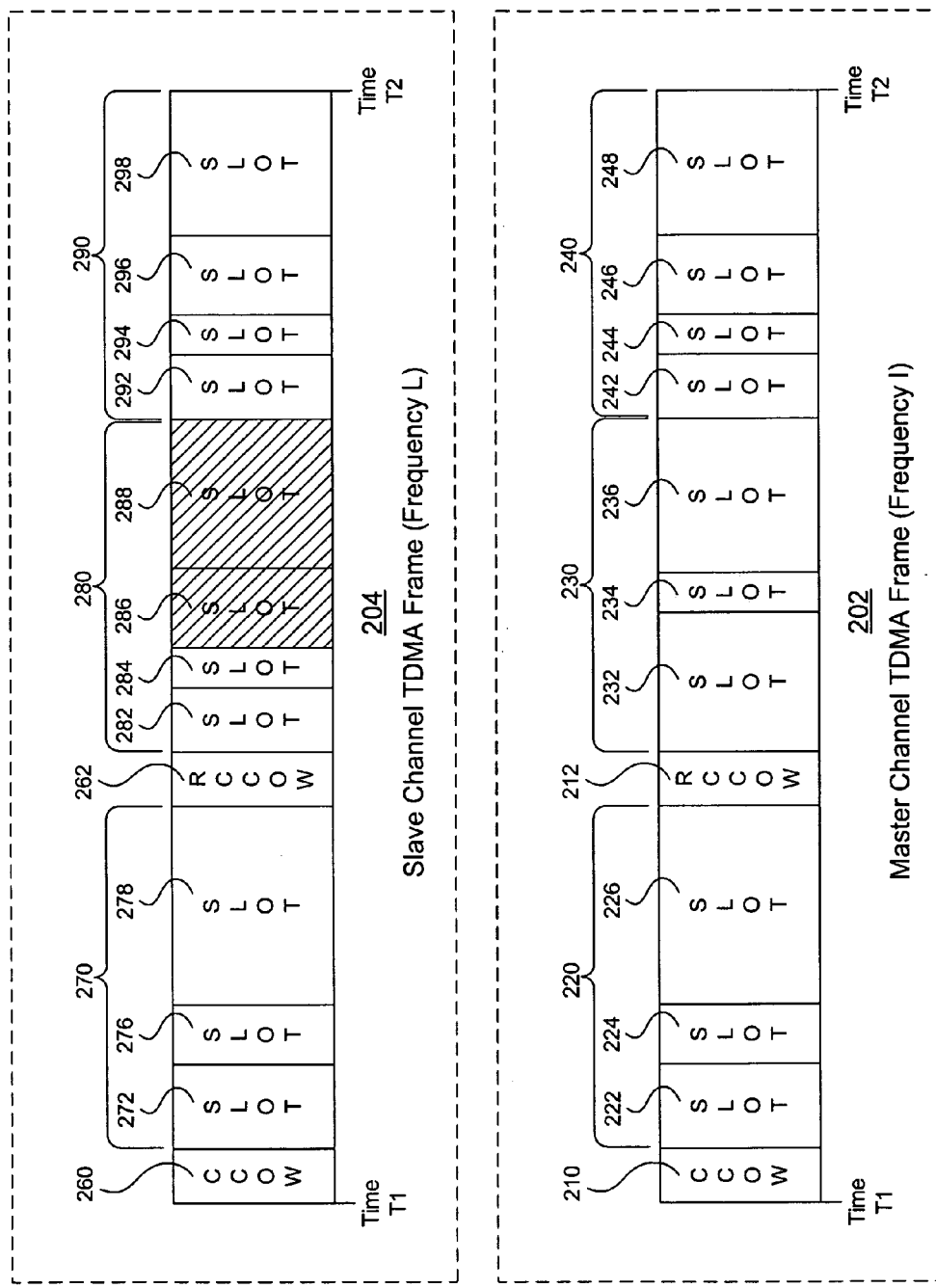
FIG. 2 represents a timing diagram of one embodiment of a TDMA frame that can be used to implement a technique of Intermixing Communication Modes on a Time Domain Multiple Access Network.

FIG. 2 represents a timing diagram of one embodiment of a TDMA frame that can be used to implement a technique of intermixing communication modes on a time domain multiple access network. A TDMA frame comprises a time period divided into smaller time periods (also known as time slots or time slices).

As shown in FIG. 2, master channel TDMA frame 202 begins at approximately time T1 and ends at approximately time T2. In one embodiment, master channel TDMA frame 202 begins and ends at time T1 and time T2, respectively, plus or minus "delta," wherein delta is less than or equal to 3 milliseconds. Master channel TDMA frame 202 includes the following time slices: Channel Control Order Wire (CCOW) 210, data segment A 220, Return Channel Control Order Wire (RCCOW) 212, data segment B 230 and data segment C 240. In the exemplary embodiment of FIG. 2, master channel TDMA frame 202 operates at frequency I. CCOW 210 includes information regarding signal control and usage such as encryption, time slot assignments and frame configuration. RCCOW 212 includes information from users such as requests to access signals and responses to status requests. Data segments A, B, C 220, 230, 240 comprise time slots that can be assigned to and used by users. Data segment A 220 comprises time slots 222, 224, 226. Data segment B 230 comprises time slots 232, 234, 236. Data segment C 240 comprises time slots 242, 244, 246, 248. Time slots 222, 224, 226, 232, 234, 236, 242, 244, 246, 248 can represent time periods that are assigned to AC users such as ACU1 122 and ACU2 124 of FIG. 1. The method of intermixing communication modes on a time domain multiple access network can be implemented with master channel TDMA frames having configurations other than master channel TDMA frame 202. For example, data segments A, B, C 220, 230, 240 can comprise time slots other than time slots 222, 224, 226, 232, 234, 236, 242, 244, 246, 248.

As shown in FIG. 2, slave channel TDMA frame 204 begins at approximately time T1 and ends at approximately time T2. In one embodiment, slave channel TDMA frame 204 begins and ends at time T1 and time T2, respectively, plus or minus "delta," wherein delta is less than or equal to 3 milliseconds. Slave channel TDMA frame 204 includes the following time slices: CCOW 260, data segment A 270, RCCOW 262, data segment B 280 and data segment C 290. In the exemplary embodiment of FIG. 2, slave channel TDMA frame 204 operates at frequency L. CCOW 260 and RCCOW 262 are substantially similar to CCOW 210 and RCCOW 212, respectively. Data segment A 270 comprises time slots 272, 276, 278. Data segment B 280 comprises time slots 282, 284, 286, 288. Data segment C 290 comprises time slots 292, 294, 296, 298. Time slots 282, 284, 286, 288 of data segment B 280 can represent time periods that are assigned to both DC and AC users such as DCU3 152, ACU1 122 and ACU2 124 of FIG. 1. In one embodiment, time slots 286, 288 are allocated to DC users and can allow DC and AC users to communicate. Time slots 272, 274, 276, 292, 294, 296, 298 can represent time periods that are assigned to only AC users.

In one embodiment, slave channel TDMA frame 204 is associated with master channel TDMA frame 202. Master channel TDMA frame 202 provides information to users regarding slave channel TDMA frame 204. In one embodiment, master channel TDMA frame 202 provides channel frequency and time period information to users regarding slave channel TDMA frame 204. An exemplary embodiment of a technique of intermixing communication modes on a time domain multiple access network is now described with reference to FIGS. 1-3.

Figure 3:
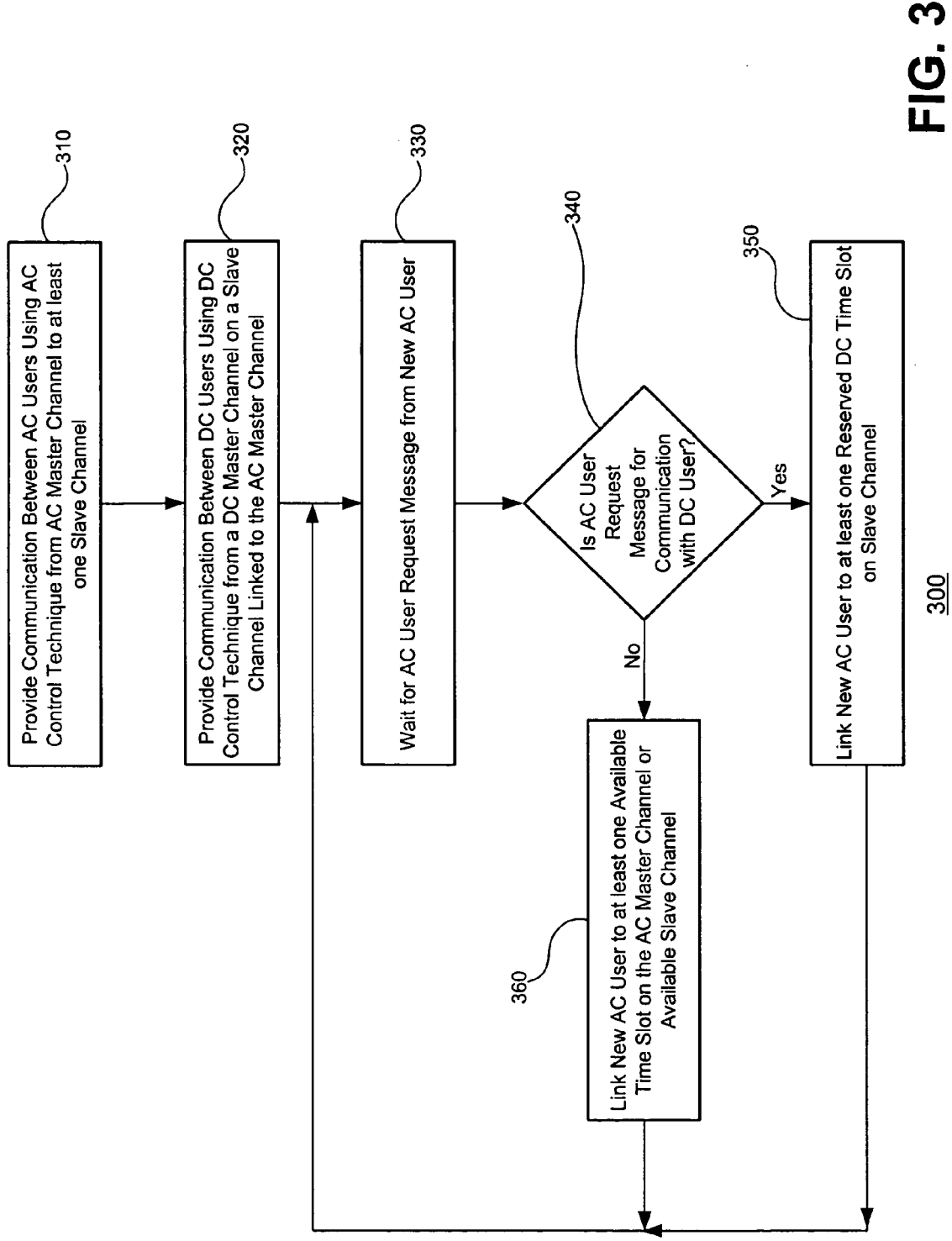
FIG. 3 is a flowchart of an exemplary method of one embodiment of a method of Intermixing Communication Modes on a Time Domain Multiple Access Network.

FIG. 3 is a flowchart illustrating exemplary process steps taken to implement a technique of intermixing communication modes on a time domain multiple access network. Certain details and features have been left out of flowchart 300 of FIG. 3 that are apparent to a person of ordinary skill in the art. For example, a step may consist of one or more sub-steps or may involve specialized equipment or materials, as known in the art. While STEPS 310 through 360 shown in flowchart 300 are sufficient to describe one embodiment of the technique of intermixing communication modes on a time domain multiple access network, other embodiments of the technique may utilize steps different from those shown in flowchart 300.

Referring to FIG. 3, at STEP 310 in flowchart 300, the method provides communication between AC users using an AC control technique from an AC master channel to at least one slave channel. In one embodiment, the method provides communication between AC users using the AC automatic control in TDMA network technique described in the '262 patent. Referring to FIGS. 1A, 1B and 2, in one embodiment, the method provides communication between ACU1 122 and ACU2 124 using master channel TDMA frame 202 operating at frequency I, which is controlled by ACCC 120 and relayed via relay 110. In one embodiment, the method can provide communication between ACU1 122 and ACU2 124 using master channel TDMA frame 202 operating at frequency J. In one embodiment, the method can provide communication between ACU1 122 and ACU2 124 using master channel TDMA frame 202 operating at frequency K. After STEP 310, the method proceeds to STEP 320.

Referring to FIG. 3, at STEP 320 in flowchart 300, the method provides communication between DC users using a DC control technique from a DC master channel on a slave channel linked to the AC master channel. Referring to FIGS. 1A and 1B, in one embodiment, DCU3 152 communicates with other DC users using DC mode control techniques such as providing a "plan of the day" for pre-assigning frequencies and time slots. After receiving a request message from a new user, the method proceeds to STEP 330.

Referring to FIG. 3, at STEP 330 in flowchart 300, the method waits for an AC user request message from a new AC user. After STEP 330, the method proceeds to STEP 340.

Referring to FIG. 3, at STEP 340, the method determines whether the AC user request message is for communication with a DC user. If the request message is for communication with a DC user, the method proceeds to STEP 350, else, the method returns to STEP 360.

Referring to FIG. 3, at STEP 350, the method links the new AC user to at least one reserved DC time slot on the slave channel. Referring to FIG. 2, in one embodiment, the method links the new AC user to one or both of reserved time slots 286, 288. After STEP 350, the method returns to STEP 330.

Referring to FIG. 3, at STEP 360, the method links the new AC user to an available time slot on the AC master channel or an available slave channel. Referring to FIG. 2, in one embodiment, the method links the new AC user to one or more of time slots 222, 224, 226, 232, 234, 236, 242, 244, 246, 248, 272, 276, 278, 282, 284, 292, 294, 296, 298. After STEP 360, the method returns to STEP 330.

From the above description, it is manifest that various techniques can be used for implementing the concepts without departing from their scope. Moreover, a person of ordinary skill in the art would recognize that changes can be made in form and detail without departing from the spirit and the scope. The described embodiments are to be considered in all respects as illustrative and not restrictive. It should also be understood that the particular embodiments described herein are capable of many rearrangements, modifications, and substitutions without departing from the scope and spirit.

I claim:

1. An intermixing communication modes on a TDMA network system, comprising:
   a) a relay;
   b) at least one AC channel controller, capable of transmitting and receiving data on a master channel having a defined AC TDMA time frame;
   c) at least one DC channel controller, capable of transmitting and receiving data on a slave channel, said slave channel having a defined DC TDMA time frame having the same start and stop times as said AC TDMA time frame, said DC TDMA time frame having both AC time slots and DC time slots;
   d) at least two AC users, capable of transmitting and receiving signals via said relay on said master channel and via said AC time slots on said DC TDMA time frame on said slave channel; and
   e) at least one DC user, capable of transmitting and receiving signals via said relay; using said DC time slots in said DC TDMA time frame of said slave channel.

2. The system of claim 1, wherein said AC TDMA time frame includes a CCOW, an RCCOW and at least one data segment.

3. The system of claim 2, wherein said at least one data segment includes at least one time slot.

4. The system of claim 1, wherein said AC TDMA time frame includes a CCOW, an RCCOW, a data segment A, a data segment B and a data segment C.

5. The system of claim 1, wherein said DC TDMA time frame includes a CCOW, an RCCOW and at least one data segment.

6. The system of claim 5, wherein said at least one data segment includes at least one time slot.

7. The system of claim 1, wherein said DC TDMA time frame includes a CCOW, an RCCOW, a data segment A, a data segment B and a data segment C.

8. A method for intermixing communication modes on a TDMA network, the method comprising the steps of:
   a) providing communication between at least two AC users using an AC control technique from an AC master channel to at least one slave channel, said AC master channel having a defined AC TDMA time frame;
   b) providing communication between at least two DC users using DC control techniques from a DC master channel on a slave channel linked to the AC master channel, said DC master channel having a defined DC TDMA time frame that is synchronous with said AC TDMA time frame, said DC TDMA time frame having both AC time slots and DC time slots;
   c) waiting for an AC user request message from a new AC user;
   d) proceeding to STEP (e) if said AC user request message is for communication with a DC user, else, proceeding to STEP (g);
   e) linking said new AC user to at least one reserved DC time slot on said DC TDMA time frame; and,
   f) returning to said waiting STEP (c);
   g) linking said new AC user to at least one available time slot on said AC TDMA time frame;
   h) returning to said waiting STEP (c).

9. An intermixing communication modes on a TDMA network system, comprising:
   a) means for providing communication between at least two AC users using an AC control technique from an AC master channel to at least one slave channel, said AC master channel having an AC TDMA time frame;
   b) means for providing communication between at least two DC users using DC control techniques from a DC master channel on a slave channel linked to the AC master channel, said DC master channel having a defined DC TDMA time frame having the same start and stop times as said AC TDMA time frame;
   c) means for waiting for an AC user request message from a new AC user;
   d) means, operatively coupled and responsive to said means for waiting for an AC user request message from a new AC user, for linking said new AC user to at least one reserved AC time slot on a slave channel, said AC time slot being located within said DC TDMA time frame;
   e) means, operatively coupled and responsive to said means for waiting for an AC user request message from a new AC user, for linking said new AC user to at least one available time slot on said AC master channel or an available slave channel.

* * * * *